United States Patent
Parashkevov (10) Patent No.: US 8,428,919 B2
(45) Date of Patent: Apr. 23, 2013

(54) COMPUTING A CONSISTENT VELOCITY VECTOR FIELD FROM A SET OF FLUXES

(75) Inventor: Rossen R. Parashkevov, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 118 days.

(21) Appl. No.: 12/812,333

(22) PCT Filed: Feb. 6, 2009

(86) PCT No.: PCT/US2009/033434
§ 371 (c)(1),
(2), (4) Date: Jul. 9, 2010

(87) PCT Pub. No.: WO2009/120409
PCT Pub. Date: Oct. 1, 2009

(65) Prior Publication Data
US 2010/0286968 A1    Nov. 11, 2010

Related U.S. Application Data

(60) Provisional application No. 61/072,295, filed on Mar. 28, 2008.

(51) Int. Cl.
*G06F 7/60* (2006.01)
*G06F 17/10* (2006.01)

(52) U.S. Cl.
USPC ........................................ 703/2; 703/9; 702/6

(58) Field of Classification Search ............... 703/2, 10, 703/9; 702/6
See application file for complete search history.

(56) References Cited

U.S. PATENT DOCUMENTS

| | | | |
|---|---|---|---|
| 5,241,608 A | 8/1993 | Fogel | |
| 5,553,206 A * | 9/1996 | Meshkat | 345/423 |
| 5,764,871 A | 6/1998 | Fogel | |
| 6,018,497 A | 1/2000 | Gunasekera | |
| 6,106,561 A | 8/2000 | Farmer | |
| 6,516,080 B1 | 2/2003 | Nur | |
| 6,611,736 B1 | 8/2003 | Waite et al. | |
| 6,823,297 B2 | 11/2004 | Jenny | |

(Continued)

FOREIGN PATENT DOCUMENTS

| WO | WO 2004/081845 | 9/2004 |
|---|---|---|
| WO | WO 2009/155274 | 12/2009 |

OTHER PUBLICATIONS

Brezzi, F. et al. (1991), "Mixed and hybrid finite element methods", Springer Series of Computational Mathematics, Springer-Verlag New York Inc., New York, pp. 113-132.

(Continued)

*Primary Examiner* — Eunhee Kim
(74) *Attorney, Agent, or Firm* — ExxonMobil Upstream Research Company Law Department (57) ABSTRACT

A method for constructing a velocity vector field from a grid and a set of fluxes for each face of the grid cells. The cells are first subdivided and internal fluxes are calculated for each cell subject to the constraints of the flux for each cell and to achieve the minimum energy state for the each cell. The minimum energy state is computed efficiently using a divergence-free correction method without introducing a pressure variable. Then, the velocity vector field is constructed from the subcell fluxes using mixed finite element interpolation.

12 Claims, 5 Drawing Sheets

U.S. PATENT DOCUMENTS

| | | | |
|---|---|---|---|
| 6,826,520 | B1 | 11/2004 | Khan et al. |
| 6,941,254 | B2 | 9/2005 | Duret |
| 6,985,841 | B2 | 1/2006 | Barroux |
| 7,149,671 | B2 | 12/2006 | Lim et al. |
| 7,337,069 | B2 | 2/2008 | Masson et al. |
| 7,369,973 | B2 | 5/2008 | Kennon et al. |
| 7,496,488 | B2 | 2/2009 | Jenny et al. |
| 7,546,229 | B2 | 6/2009 | Jenny et al. |
| 7,603,265 | B2 | 10/2009 | Mainguy et al. |
| 7,617,083 | B2 | 11/2009 | Bennis et al. |
| 7,650,270 | B2 | 1/2010 | Le Ravalec-Dupin et al. |
| 7,707,018 | B2 | 4/2010 | Shaw |
| 7,860,654 | B2 * | 12/2010 | Stone .............................. 702/2 |
| 2002/0013687 | A1 | 1/2002 | Ortoleva |
| 2005/0114104 | A1 | 5/2005 | Friedl et al. |
| 2008/0208539 | A1 | 8/2008 | Lee et al. |
| 2009/0319242 | A1 | 12/2009 | Lee et al. |
| 2010/0004908 | A1 | 1/2010 | Lunati |
| 2010/0094605 | A1 | 4/2010 | Hajibeygi et al. |

OTHER PUBLICATIONS

Cai, Z. et al. (1998), "Overlapping domain decomposition for a mixed finite element method in three dimensions", Domain Decomposition Methods in Sciences and Engineering (Bergen, Norway), $9^{th}$ Int'l. Conf., Domain Composition Press, pp. 188-196.

Chavent, G. et al. (1990), "Discontinuous and Mixed Finite Elements for Two-Phase Incompressible Flow", SPE Reservoir Engineering, SPE 16018, pp. 567-575.

Chen, Z. et al. (1997), "From Single-Phase to Compositional Flow: Applicability of Mixed Finite Elements", Petro. Abstract No. 655483.

Durlofsky, L.J. et al. (1993), "Development of a Mixed Finite-Element-Based Compositional Reservoir Simulator", Petro. Abstract No. 547722.

Kececioglu, I. (1992), "An Adaptive Finite Element Method for Computing Coupled Porous-Media Problems with Moving Fronts", SPE Advanced Tech. Series, v. 1, No. 1, pp. 42-51.

King, M.J. et al. (1999), "Flow Simulation of Geologic Models", SPE Reservoir Eval. & Eng. 2(4), pp. 351-367.

Nedelec, J.C. (1986), "A new family of mixed finite elements in $R^3$", Numer. Math. 50, pp. 57-81.

Nedelec, J.C. (1980), "Mixed finite elements in $R^3$", Numer. Math. 35, pp. 315-341.

Quian, J. et al. (2002), "Finite-Difference Quasi-P. Travel Times for Anisotropic Media", Petro. Abstract No. 778082.

Raviart, P.A. et al. (1977), "A mixed finite element method for second order elliptic problems", Mathematical Aspects of the Finite Element Method, Lecture Notes in Mathematics, v. 606, A. Dold and B. Eckmann, eds., pp. 292-315.

Sutopo, N.A. et al. (2002), "Mixed finite volume element method for multiphase flow simulation", Petro. Abstract No. 811596.

*International Search Report and Written Opinion*, dated Mar. 25, 2009, PCT/US09/33434.

\* cited by examiner

COMPUTING A CONSISTENT VELOCITY VECTOR FIELD FROM A SET OF FLUXES

CROSS-REFERENCE TO RELATED APPLICATION

This application is the National Stage of International Application No. PCT/US2009/033434, that published as WO 2009/120409, filed Feb. 6, 2009, which claims the benefit of U.S. Provisional Application No. 61/072,295, filed Mar. 28, 2008, each of which is incorporated herein by reference, in its entirety, for all purposes.

BACKGROUND OF THE INVENTION

1. Field of the Invention

This disclosure relates generally to the field of building numerical models suitable for computer simulation of diffusive processes in heterogeneous media, such as fluid flow in underground porous rock formations like oil and gas reservoirs and/or aquifers.

2. Description of Related Art

Computer simulation of fluid flow in porous media is widely used in the oil industry, hydrology, environmental studies, and remediation of contaminated groundwater. Simulation predictions often have a significant impact on the economic valuation of assets and government environmental policies. This invention is related to a key step in building accurate simulation models. In the preferred embodiments, reference is made to the application of the disclosure to hydrocarbon recovery, but the scope of the invention is not limited to the simulation of hydrocarbon recovery.

Very often, there is a need to compute a velocity vector field consistent with a set of fluxes given with respect to a structured or unstructured simulation grid. Since many fluid flow simulators use Finite Difference (FD) or Control Volume discretizations, they do not compute a fluid velocity vector field directly but rather generate a set of fluxes on cell faces. Therefore, there is the need to convert a set a fluxes into a velocity field.

Once an explicit velocity vector field is available, it may be used to compute streamlines and dispersion tensor coefficients. Streamlines can be used for visualization or streamline simulations.

Another example of using a velocity vector field is to compare fluxes computed on a fine grid to fluxes on several coarse grids for the purpose of evaluating the quality of different coarse (simulation scale) grids. Similarly, one could use such fine-coarse grid flux comparisons for evaluating and/or generating upscaled reservoir properties. Also, fluxes may be used to convert from an unstructured grid to a structured grid for visualization purposes. A comparison of fluxes computed on unstructured and structured grids can be used for testing and validating the computer code that uses the unstructured grid discretization. In particular, the effect of non-orthogonalities in the grid upon the accuracy of the computed fluxes may be tested. Since flux comparison is local, it could help pinpoint problem areas.

Comparing fluxes computed with respect to different grids is a non-trivial task. Although, strictly speaking, fluxes are scalars, they contain geometric information which has to be taken into account for any meaningful comparison. This geometric information includes the area and the orientation of the surface with respect to which the fluxes are computed. The problem of comparing fluxes on different grids is somewhat similar to comparing two vectors with components given with respect to two different coordinate systems. In order to obtain a meaningful comparison, one needs to know the components of the two vectors with respect to the same coordinate system. Similarly, one needs to transfer the two fluxes to a single grid in order to be able to perform a meaningful comparison. As a transfer mechanism, we suggest using a physically realistic velocity vector field, which is defined at every point and is computed using the unstructured grid fluxes, the grid-block geometry, and the underlying permeability field.

SUMMARY OF INVENTION

A method for reconstructing a velocity vector field from a given set of fluxes defined on the faces of cells comprising an unstructured grid is disclosed. The method generally comprises at least some of the following steps: subdividing each cell into triangular prisms with a common edge (subcells); using a divergence-free correction method to reduce the number of equations (for calculating the flux across faces between subcells) to be solved per cell; finding a solution that satisfies the flux constraints and minimizes the complementary energy for each cell; and creating a set of velocity vectors from the fluxes.

DETAILED DESCRIPTION

In this disclosure, a new method for calculating a velocity vector field consistent with fluxes computed on an unstructured grids is described. By consistent, the following is meant:

on the boundaries (faces) of each grid block, the velocity vector field generates fluxes that are identical to the fluxes given by the unstructured grid discretization;

inside each grid block, the velocity vector field chooses the paths of least resistance by minimizing a discrete complementary energy functional; and the velocity vector field can be point-wise divergence-free, which ensures mass conservation with respect to any volume.

To obtain a consistent velocity vector field, solve a steady-state, single-phase pressure equation inside each grid-block with specified flux boundary conditions. The preferred method for solving the pressure equation is the Mixed Finite Element (MFE) Method with the lowest-order Raviart-Thomas-Nedelec (RTN) velocity vector field defined on triangular prisms (see P.-A. Raviart and J.-M. Thomas, *A mixed finite element method for second order elliptic problems*, Mathematical Aspects of the Finite Element Method (A. Dold and B. Eckmann, eds.), Lecture Notes in Mathematics, vol. 606, Springer—Verlag, Heidelberg, 1977, pp. 292-315; J. C. Nedelec, *Mixed finite elements in $R^3$*, Numer. Math. 35

(1980), 315-341; J. C. Nedelec, *A new family of mixed finite elements in $R^3$*, Numer. Math. 50 (1986), 57-81).

The choice of solution method is determined by the following requirements:

(1) The velocity vector field must be defined at every point. This requirement suggests using a Finite Element Method rather than Finite Differences.

(2) The velocity vector field must have a continuous normal component with respect to arbitrary surfaces. This requirement suggests using a discretization technique with separate unknowns for the velocity and pressure variables, thus excluding the standard (pressure based) Finite Element Method. Also, it excludes Control Volume Methods that involve vector fields with normal component continuous only at a discrete set of points.

(3) The velocity vector field must allow to be point-wise divergence-free, so that it can conserve mass with respect to arbitrary volumes. This requirement suggests using a Raviart-Thomas-Nedelec (RTN) type of velocity space.

(4) The velocity vector field must be well-defined on triangular prisms, so that unstructured irregular grids can be accommodated. This requirement suggests using a Mixed Finite Element Method.

(5) The discretization technique must be able to impose exactly flux boundary conditions, so that the velocity vector field can be consistent with the fluxes computed by using unstructured grids. Again, Mixed Finite Element Methods satisfy this condition.

The disclosed approach offers new capabilities and advantages over the existing technology. It allows treatment of both compressible and incompressible fluids. It increases the resolution of the simulation grid by about 5-6 times at a very small extra computational and memory cost. The computation of the velocity vector field is done locally, separately on each grid block. The computation of the velocity vector field involves solving a 1×1 linear system per grid block regardless of the number of faces that define the grid block. It provides a new capability for computing streamlines on unstructured 2.5D grids. It provides a new capability for testing the effect of non-orthogonalities in a grid upon the accuracy of the computed fluxes.

We begin with a brief review of the Mixed Finite Element Method (MFEM) with lowest-order Raviart-Thomas-Nedelec (RTN) (see Raviart et al., supra; Nedelec, *Mixed finite elements in $R^3$*, supra; Nedelec, *A new family of mixed finite elements in $R^3$*, supra) approximation space for second-order elliptic boundary value problems in three dimensions corresponding to single-phase, steady-state Darcy flow in porous media. The standard notation (see R. Adams, *Sobolev spaces*, Academic Press, New York, 1975) $L^2(\Omega)$ for the space of functions that are square integrable over a bounded, open domain $\Omega \subset R^3$ with Lipschitz continuous boundary $\partial\Omega$ are used. $H^1(\Omega)$ denotes the space of functions that are in $L^2(\Omega)$ together with all their first derivatives.

Consider a pure Neumann boundary value problem: find $p \in H^1(\Omega)$ such that $$\begin{cases} -\nabla \cdot (K\nabla p) = f, & \text{in } \Omega, \\ (K\nabla p) \cdot n = g, & \text{on } \partial\Omega, \end{cases} \quad (1)$$

where $f \in L^2(\Omega)$ satisfies the relation:

$$\int_\Omega f\,dx\,dy\,dz = \int_{\partial\Omega} g\,dS, \quad (2)$$

and n denotes the unit outward normal vector to $\partial\Omega$. The symbols $\nabla \cdot$ and $\nabla$ stand for the divergence and gradient operators, respectively. Assume that $K=(K_{ij})_{3\times 3}$ is a given real-valued symmetric matrix function with bounded and measurable entries $K_{ij}$ (i,j=1, 2, 3) and satisfies the ellipticity condition, i.e., there exist positive constants $\alpha_1$ and $\alpha_2$ such that $$\alpha_1 \xi^t \xi \le \xi^t K(x,y,z)\xi \le \alpha_2 \xi^t \xi \quad (3)$$

for all $\xi \in R^3$ and almost all $(x,y,z) \in \overline{\Omega}$.

In the context of single-phase, steady-state fluid flow in porous media, for example, p is the fluid pressure, $v=-K\nabla p$ is the fluid (Darcy) velocity, K is the permeability tensor of the porous media, g is the specified flux on the boundary and f represents sources (sinks).

As usual, without loss of generality, consider the case of homogeneous boundary conditions, i.e., g=0.

Use the following space to define the mixed variational problem. Let $$H(\text{div};\Omega) \equiv \{w \in L^2(\Omega)^3 | \nabla \cdot w \in L^2(\Omega)\},$$

which is a Hilbert space (a complete norm vector space) equipped with the norm $$\|w\|_{H(\text{div};\Omega)} \equiv (\|w\|_{L^2(\Omega)}^2 + \|\nabla \cdot w\|_{L^2(\Omega)}^2)^{1/2}$$

and the associated inner product. By introducing the velocity variable $$v = -K\nabla p,$$

which is of practical interest for many physical problems (including fluid flow in porous media), we can rewrite the second-order partial differential equation (PDE) of (1) as a first-order system $$\begin{cases} K^{-1}v + \nabla p = 0, \\ \nabla \cdot v = f, \end{cases} \quad (4)$$

and obtain the mixed formulation of (1): find $(v,p) \in V \times \Lambda$ such that $$\begin{cases} a(v, w) - b(w, p) = 0, & \forall w \in V, \\ b(v, \lambda) = (f, \lambda), & \forall \lambda \in \Lambda. \end{cases} \quad (5)$$

Here $V=H_0(\text{div};\Omega) \equiv \{w \in H(\text{div};\Omega) | w \cdot n = 0 \text{ on } \partial\Omega\}$, $\Lambda$ is the quotient space $L_0^2(\Omega) = L^2(\Omega)/\{\text{constants}\}$, the bilinear forms $a(\cdot,\cdot): V \times V \to R$ and $b(\cdot,\cdot): V \times \Lambda \to R$ are defined by $$a(w, u) = \int_\Omega (K^{-1}w) \cdot u\,dx\,dy\,dz$$

and $$b(w, \lambda) = \int_\Omega (\nabla \cdot w)\lambda\,dx\,dy\,dz$$

for any $w, u \in V$ and $\lambda \in \Lambda$, respectively, and $(\cdot,\cdot)$ denotes the $L^2(\Omega)$ inner product.

To discretize the mixed formulation (5), assume that there are two given finite-dimensional finite element subspaces:

$$V^h \subset V \text{ and } \Lambda^h \subset \Lambda$$

defined on a unstructured mesh with elements of size O(h). The mixed approximation to (v,p) is defined to be the pair, $(v^h, p^h) \in V^h \times \Lambda^h$, satisfying $$\begin{cases} a(v^h, w) - b(w, p^h) = 0, & \forall w \in V^h, \\ b(v^h, \lambda) = (f, \lambda), & \forall \lambda \in \Lambda^h. \end{cases} \quad (6)$$

Refer to Raviart et al., supra; F. Brezzi and M. Fortin, *Mixed and hybrid finite element methods*, Springer Series of Computational Mathematics, Springer-Verlag New York Inc., New York, 1991; Nedelec, *Mixed finite elements in $R^3$*, supra; and Nedelec, *A new family of mixed finite elements in $R^3$*, supra for the definition of classes of approximation subspaces $V^h$ and $\nabla^h$. In 2-D, those spaces are defined on triangles and quadrilaterals. In 3-D, they are defined on tetrahedra, hexahedra and triangular prisms. The meshes can be unstructured and distorted, thus allowing compliance with complex geometries. For simplicity, in this disclosure only the lowest-order R-T-N space defined on a triangular prismatic partition of $\Omega$ will be considered. Such a space for the velocity consists of vector functions which are piecewise polynomial with respect to the triangular prisms and whose normal component is continuous across element boundaries. The corresponding pressure space $\Lambda^h$ consists of discontinuous piecewise constants with respect to the triangulation $T^h$ with a fixed value on one element. Specifically, let $T^h$ denote a partition of $\Omega$ into non-overlapping triangular prisms. Then the lowest-order R-T-N approximation space for the velocity on a triangular prism $\tau \in T^h$ (assuming the two triangular faces are parallel to the plane z=const.) is defined by $$V^h(\tau) = \begin{bmatrix} a + dx \\ b + dy \\ c + ez \end{bmatrix}, \quad (7)$$

and the corresponding pressure space is $$\Lambda^h(\tau) = \text{constant}, \quad (8)$$

where a, b, c, d and e are the five constants which uniquely determine the velocity vector inside the triangular prism τ. In 2D, the constants c and e are identically zero. It is well-known that the above R-T-N space satisfies the Babuska-Brezzi stability condition (cf. Raviart et al., supra): there exists a positive constant β independent of the mesh size h of $T^h$ such that $$\sup_{w \in V^h} \frac{b(w, \lambda)}{\|w\|_{H(div, \Omega)}} \geq \beta \|\lambda\|_{L^2(\Omega)}, \forall \lambda \in \Lambda^h. \quad (9)$$

The stability condition (9) is used in (Raviart et al., supra; Brezzi et al., supra) to rigorously prove the convergence rate of the MFEM. The lowest-order R-T-N space defined in (7)-(8) is first-order convergent both with respect to the pressure and the velocity variables. First-order convergence means that if (v,p) is the exact solution to the continuous problem (5) and $(v^h, p^h)$ is the MFEM approximation obtained by solving the discrete problem (6), then there exists a positive constant C independent of the mesh parameter h, such that $$\|p - p^h\|_{L^2(\Omega)} + \|v - v^h\|_{H(div, \Omega)} \leq Ch(\|p\|_{H^1(\Omega)} + \|v\|_{H^1(\Omega)^3}). \quad (10)$$

Also, Raviart and Thomas in (Raviart et al., supra) demonstrated the existence of a projection operator $\Pi_h : V \rightarrow V^h$ such that, for any $v \in V$, $$b(\Pi_h v, \lambda) = b(v, \lambda), \forall \lambda \in \Lambda^h, \quad (11)$$

$$\|\Pi_h v - v\|_{L^2(\Omega)^3} \leq Ch\|v\|_{H^1(\Omega)^2}. \quad (12)$$

Once a basis is selected for $\Lambda^h$ and $V^h$, one can write the discrete equations in a matrix form. Let $\{v_i\}_{i=1}^L$ be a basis for $V^h$ and $\{\theta_k\}_{k=1}^M$ be a basis for $\Lambda^h$. Then, (6) leads to the matrix equation $$\begin{bmatrix} M & B \\ B^T & 0 \end{bmatrix} \begin{bmatrix} V \\ P \end{bmatrix} = \begin{bmatrix} 0 \\ F \end{bmatrix}, \quad (13)$$

where V and P are coefficient vectors representing the vector and pressure unknowns, respectively, and the matrices M and B are given by $$M_{i,j} = a(v_i, v_j)$$

$$B_{i,k} = -b(v_i, \theta_k)$$

$$F_k = -(f, \theta_k). \quad (14)$$

The rectangular matrix −B is the discrete gradient operator while its adjoint, $B^T$ is the discrete divergence operator. The mass matrix M is symmetric and positive definite. The matrix in (13) is symmetric but indefinite (it has both positive and negative eigenvalues).

In the case when MFEM is used to discretize the equations for the time-dependent Darcy flow in porous media, the corresponding matrix equations take the form:

$$\begin{bmatrix} M & B \\ B^T & -D \end{bmatrix} \begin{bmatrix} V \\ P \end{bmatrix} = \begin{bmatrix} 0 \\ F \end{bmatrix}, \quad (15)$$

where the matrix D is diagonal with strictly positive diagonal entries.

2D Formulation

In this section practical algorithms that implement the general abstract formulation of the MFEM from the previous section are described.

Figure 1:
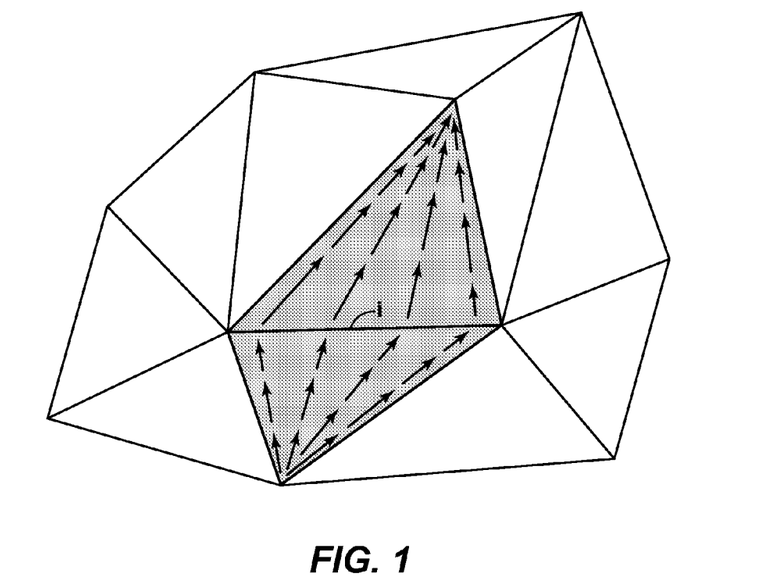
FIG. 1 illustrates the vector basis function associated with the $i^{th}$ edge is identically zero outside the two triangles sharing edge i.

Next, a particular choice of vector basis functions that span the lowest-order R-T (see Raviart et al., supra) space on triangles are described. Each vector basis function is chosen to be non-zero in the union of two triangles sharing the same edge and zero everywhere else. Thus, there is one basis function associated with each triangle edge (except edges that are part of the boundary $\partial \Omega$). Also, each basis function has unit flux across the common edge and zero fluxes across all other edges, as illustrated in FIG. 1).

Figure 2:
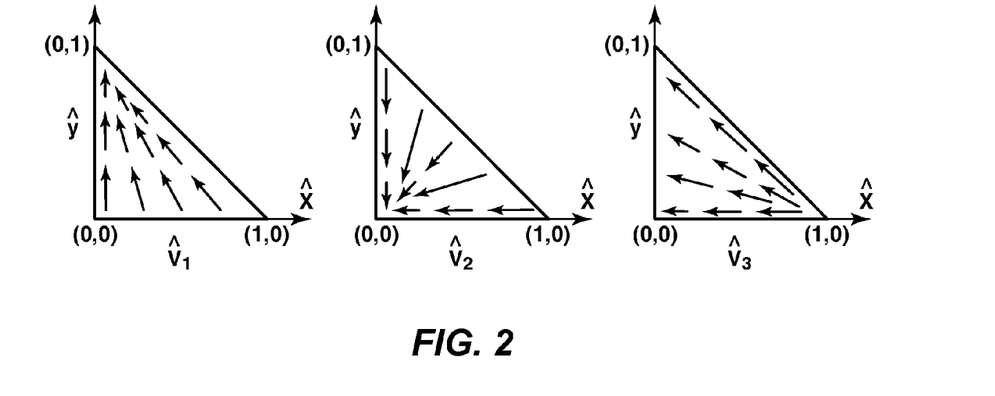
FIG. 2 illustrates the vector functions associated with the edges of a reference triangle.

Every vector basis function is defined separately in each of the two triangles by first defining it on a reference triangle. Then using a (specific for each triangle) transformation the basis function is defined on the "real" triangle. It is convenient to use a reference triangle determined by the points with coordinates (0, 0), (1, 0) and (0, 1). As illustrated in FIG. 2, define three vector functions, each associated with one edge of the reference triangle:

$$\hat{v}_1 = \begin{bmatrix} -\hat{x} \\ 1-\hat{y} \end{bmatrix}, \hat{v}_2 = \begin{bmatrix} -\hat{x} \\ -\hat{y} \end{bmatrix}, \hat{v}_3 = \begin{bmatrix} -1+\hat{x} \\ \hat{y} \end{bmatrix}. \quad (16)$$

Figure 3:
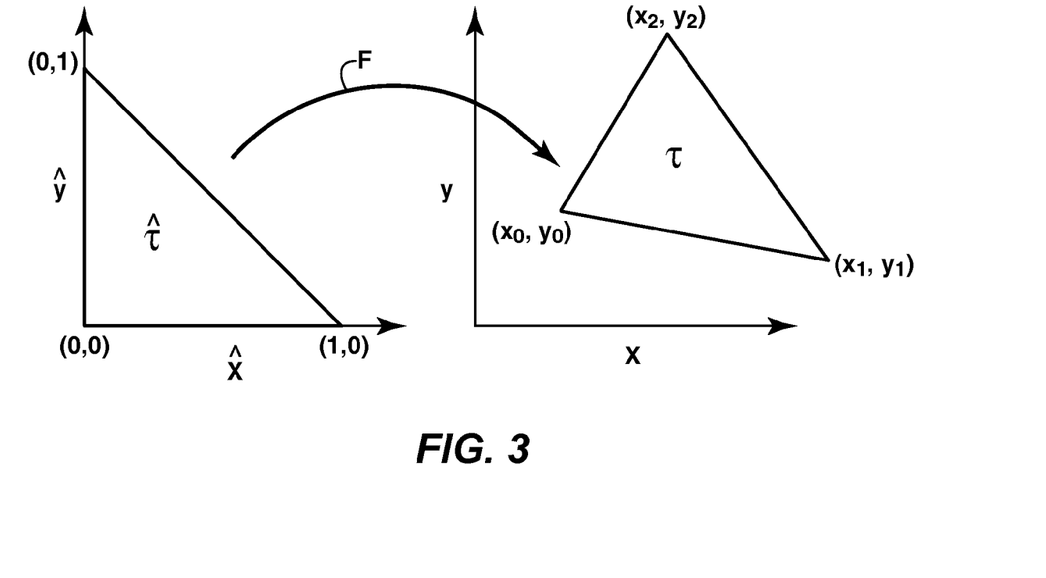
FIG. 3 illustrates the affine mapping F from the reference triangle $\hat{\tau}$ to the physical triangle $\tau$.

Let $\tau$ be an arbitrary triangle with vertices at $(x_0,y_0)$, $(x_1,y_1)$ and $(x_2,y_2)$. Now that the vector functions on the reference triangle t are defined, consider the mapping $F:\hat{\tau}\rightarrow\tau$ from the reference triangle to the physical triangle, illustrated in FIG. 3, such that the point (0,0) is mapped to $(x_0,y_0)$, (1,0) to $(x_1,y_1)$ and (0,1) to $(x_2,y_2)$. It is easy to verify that the mapping $(x,y)=F(\hat{x},\hat{y})$ is given by the following formula:

$$\begin{bmatrix} x \\ y \end{bmatrix} = \begin{bmatrix} x_0 \\ y_0 \end{bmatrix} + \begin{bmatrix} x_{10} & x_{20} \\ y_{10} & y_{20} \end{bmatrix}\begin{bmatrix} \hat{x} \\ \hat{y} \end{bmatrix}, \quad (17)$$

where the notation $x_{ij}=x_i-x_j$ and $y_{ij}=y_i-y_j$ is used. Note that the Jacobian matrix B of the mapping F $$B = \begin{bmatrix} x_{10} & x_{20} \\ y_{10} & y_{20} \end{bmatrix} \quad (18)$$

is constant, i.e. independent of $(\hat{x},\hat{y})$. Such mappings are called affine and the following formula holds:

$$\text{area } (\tau) = \frac{1}{2}|\det B|. \quad (19)$$

Given a vector function $\hat{v}$ on the reference triangle, its image v on the physical triangle can be defined by $$v(x,y) = \frac{1}{|\det B|}B\hat{v}(\hat{x}(x,y),\hat{y}(x,y)), \quad (20)$$

where $\hat{x}=\hat{x}(x,y)$ and $\hat{y}=\hat{y}(x,y)$ are the components of the inverse transformation $F^{-1}:\tau\rightarrow\hat{\tau}$. Formula (20) is usually called contravariant or Piola's transformation and has some very useful properties:

Piola's transformation preserves the normal components of the vector;
Piola's transformation preserves divergence-free vectors.
Moreover, the following formula holds (see Brezzi et al., supra):

$$div v = \frac{1}{|\det B|} div \hat{v}. \quad (21)$$

Since the vector functions defined in (16) have unit normal flux across one of the edges of $\hat{\tau}$ and zero normal flux across the other two edges, the same is true for their images, due to the first property. Also, by the second property and from (19), for i=1, 2, 3, $$div v_i = \frac{1}{|\det B|} div \hat{v}_i = \pm \frac{2}{|\det B|} = \pm \frac{1}{\text{area } (\tau)}. \quad (22)$$

Figure 4:
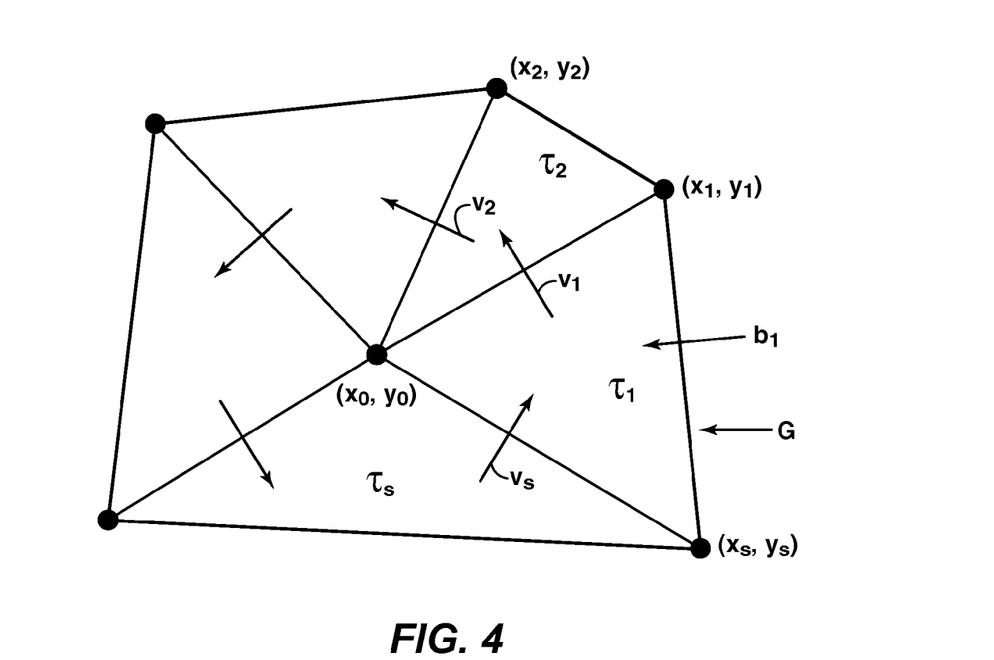
FIG. 4 illustrates a grid-block G subdivided into s triangles.

The Mixed Finite Element problem on any grid-block may now be defined. As illustrated in FIG. 4, let $(x_0,y_0)$ be any interior point of the grid-block G. Then divide G into s triangles by connecting $(x_0,y_0)$ to each vertex $(x_i,y_i)$, for i=1, 2, . . . , s. Let triangle $\tau_i$ have permeability $k_i$. The reference triangle $\hat{\tau}$ is mapped onto each triangle $\tau_i$ by an affine mapping $F_i$ with the following Jacobian matrices:

$$B_1 = \begin{bmatrix} x_{s0} & x_{10} \\ y_{s0} & y_{10} \end{bmatrix}, B_i = \begin{bmatrix} x_{i-1,0} & x_{i0} \\ y_{i-1,0} & y_{i0} \end{bmatrix}, \quad (23)$$

for $i = 2, 3, \ldots, s$.

Let $v_i$ be the basis vector function associated with the $i^{th}$ interior edge and let $b_i$ be the basis vector function associated with the $i^{th}$ boundary edge. In this disclosure, the counter-clockwise direction is considered to be positive for the interior edges and for the boundary edges, the positive direction is pointing inwards the grid-block. Let $b_1, b_2, \ldots, b_s$ be the given fluxes across the corresponding boundary edges. It is assumes (without loss of generality) that the boundary data is consistent with zero interior sources (sinks), i.e.

$$\sum_{i=1}^{s} b_i = 0.$$

The choice of positive direction implies that positive boundary fluxes correspond to fluid entering the grid-block. Denote by $v^h$ the vector function which is the MFEM solution to the grid-block problem. Since $v^h$ has known fluxes across all boundary edges, only the interior fluxes need to be solved, i.e. we need to find a vector function $v^h_0=v^h-b$, where $$b=b_1 b_1+b_2 b_2+\ldots+b_s b_s. \quad (24)$$

Let $$v_0^h=V_1 v_1+V_2 v_2+\ldots+V_s v_s \quad (25)$$

be the (unique) representation of the function $v^h_0$ with respect to the chosen basis functions $v_1, v_2, \ldots, v_s$.

Normally, one needs to solve a $(2s)\times(2s)$ linear system of the type (13) for the unknown coefficients $V_1, V_2, \ldots, V_s$ and the unknown pressures. Using the divergence-free correction approach (see, e.g., Z. Cai, R. R. Parashkevov, T. F. Russell, and X. Ye, *Overlapping domain decomposition for a mixed finite element method in three dimensions*, Domain Decomposition Methods in Sciences and Engineering (Bergen, Norway) (P. E Bjørstad, M. S. Espedal, and D. E. Keyes, eds.), Ninth International Conference, Domain Decomposition Press, 1998, pp. 188-96 and the references therein) reduces the system to 1×1. In other words, explicit formulae for the MFEM solution in this special case can be written. The divergence-free subspace is one-dimensional and is spanned by the vector function d, where $$d=v_1+v_2+\ldots+v_s. \quad (26)$$

The transpose C of the coefficient vector of the function d $$C=[1, 1, \ldots, 1]_{1\times s} \quad (27)$$

is a discrete analogue of the differential operator $$\text{curl} = \begin{bmatrix} \frac{\partial}{\partial y} \\ -\frac{\partial}{\partial x} \end{bmatrix}$$

and plays an important role in the algorithms described below.

The first step of the divergence-free approach is to compute an initial guess $v^I$ for the velocity field, such that:

$v^I$ satisfies no-flow boundary conditions;

$\int_{\tau_i} \text{div} \, v^I = b_i$, for $i=1, 2, \ldots, s$

If $$v^I = V_1^I v_1 + V_2^I v_2 + \ldots + V_s^I v_s, \quad (28)$$

then the following Algorithm computes its coefficient vector:

Set $V_1^I = 1$.

For $i=2, 3, \ldots, s$, set $V_i^I = V_{i-1}^I + b_i$.

The solution $v_0^h$ can now be computed by adding a divergence-free correction to the initial guess $v^I$:

$$v_0^h = v^I - \frac{\int_G k^{-1}(v^I + b) \cdot d}{\int_G k^{-1} d \cdot d} d. \quad (29)$$

One can easily verify that $v^h = v_0^h + b$ minimizes the so-called *Complementary Energy* (see Brezzi et al., supra) functional F given by $$F(w) = \int_G k^{-1} w \cdot w, \quad (30)$$

over the set of divergence-free vector functions in the lowest-order R-T space satisfying the prescribed flux boundary conditions. In contrast, the exact solution of the PDE (5) v minimizes F over the set of all divergence-free vector functions satisfying the prescribed flux boundary conditions. The physical interpretation of F is that its minimum realizes the velocity field which corresponds to the path of minimum resistance.

Next, formulae for evaluating the integrals that appear in (29) are given. The integral in the denominator can be evaluated either by $$\int_G k^{-1} d \cdot d = \sum_{i=1}^s \int_{\tau_i} k_i^{-1} d \cdot d \quad (31)$$

$$= \frac{1}{2} \frac{x_{1s}^2 + y_{1s}^2}{k_1 |\det B_1|} + \frac{1}{2} \sum_{i=2}^s \frac{x_{i,i-1}^2 + y_{i,i-1}^2}{k_i |\det B_i|},$$

or by $$\int_G k^{-1} d \cdot d = CMC^T, \quad (32)$$

where M is the s×s mass matrix with entries $$m_{ij} = \int_G k^{-1} v_i \cdot v_j = \int_G k^{-1} v_j \cdot v_i = m_{ji}. \quad (33)$$

M is a sparse, symmetric and positive definite matrix and has exactly three non-zero entries per row:

$$M = \begin{bmatrix} m_{11} & m_{12} & 0 & \cdots & 0 & m_{1s} \\ m_{21} & m_{22} & m_{23} & 0 & \cdots & 0 \\ & & \ddots & \ddots & \ddots & \\ 0 & \cdots & 0 & m_{s-1,s-2} & m_{s-1,s-1} & m_{s-1,s} \\ m_{s1} & 0 & \cdots & 0 & m_{s,s-1} & m_{ss} \end{bmatrix}_{s \times s} \quad (34)$$

One can use the following expressions to evaluate the integral in the nominator of formula (29):

$$\int_G k^{-1} v^I \cdot d = CMV^I, \quad (35)$$

and $$\int_G k^{-1} b \cdot d = \sum_{i=1}^s b_i F_i, \quad (36)$$

where $$F_i = \int_G k^{-1} b_i \cdot d = \int_{\tau_i} k_i^{-1} b_i \cdot d. \quad (37)$$

Finally, the equivalent to formula (29) in terms of coefficient vectors is given by $$\text{Set } V = V^I - \frac{CMV^I + \sum_{i=1}^s b_i F_i}{CMC^T} C^T. \quad (38)$$

Once the coefficient vector V is known, so is the MFEM solution according to formula (25).

The definition (33) of the mass matrix is based on Assumption 3, which states that the permeability is strictly positive. If that assumption is violated, then the mass matrix is not well-defined. However, the ratio $$\frac{CMV^I + \sum_{i=1}^s b_i F_i}{CMC^T}$$

tends to a finite limit as the permeability in one or several triangles approaches zero.

2.5D Formulation

Figure 5:
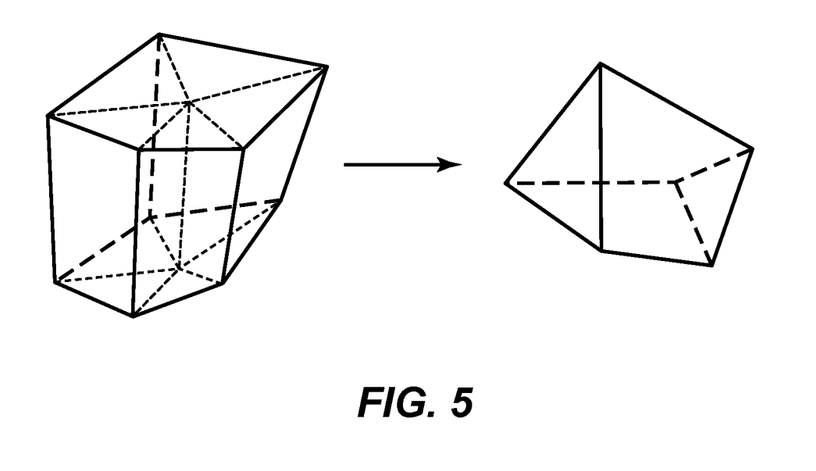
FIG. 5 illustrates a 2.5D grid block split into prisms.

In this section, the application of the disclosed method to 2.5D unstructured grids is described. First, connect the centers of the top and bottom face with a straight line segment. Next connect with straight line segments the center of the top face to all its corners.

In a similar way, partition the bottom face into triangular subfaces. Now the original 2.5D grid block can be regarded as a collection of s triangular prisms all of them sharing the same central edge, as shown in FIG. 5.

Note that the above construction does not assume that any faces of the original grid block are planar. To handle this general geometry, again as in the 2D case, introduce a reference triangular prism, illustrated in FIG. 6, and a mapping F from the reference unit prism to the physical space.

Figure 6:
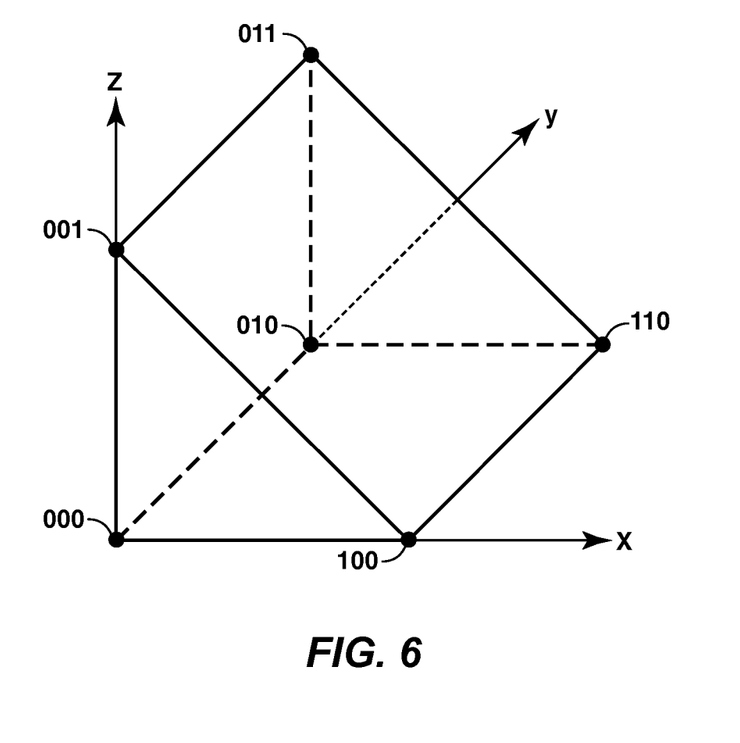
FIG. 6 illustrates a reference triangle prism.
Figure 7:
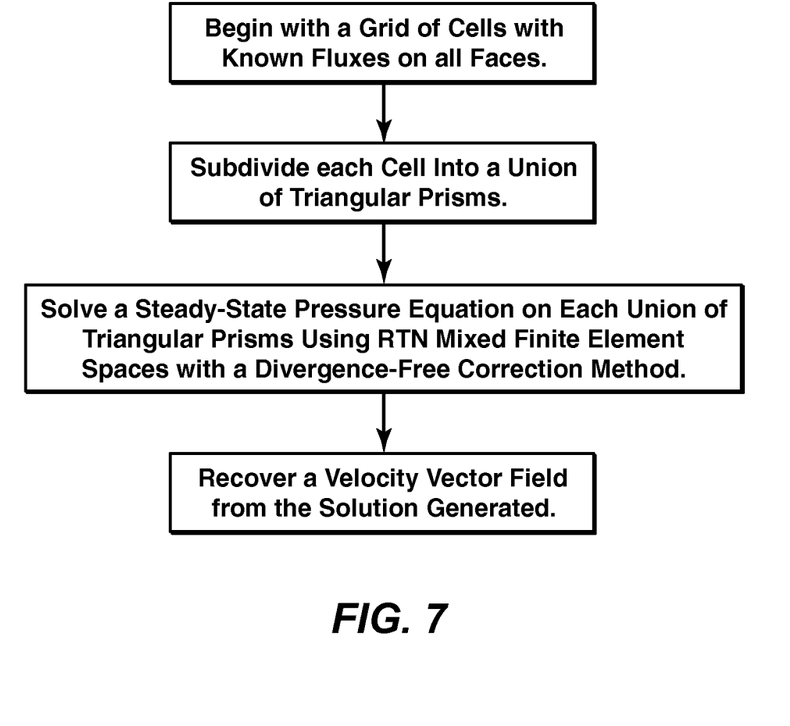
FIG. 7 is a flowchart illustrating one embodiment of the disclosed method.
Figure 8:
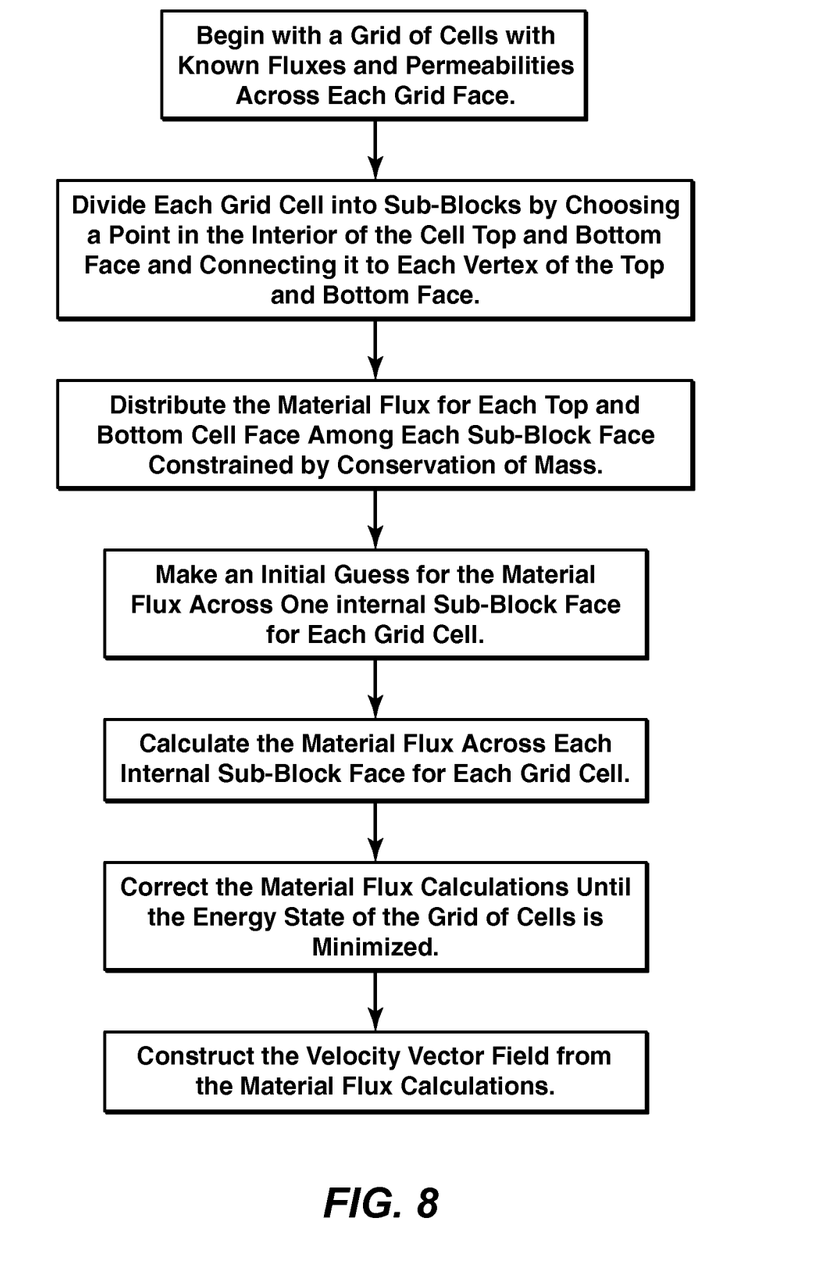
FIG. 8 is a flowchart illustrating another embodiment of the disclosed method.

On the reference prism, define five vector basis functions associated with each face (Nedelec, *Mixed finite elements in* $R^3$, supra; Nedelec, *A new family of mixed finite elements in* $R^3$, supra). On the two triangular faces, as shown in FIG. 6, the vector functions are $$\hat{v}_1 = \begin{bmatrix} 0 \\ -1+\hat{y} \\ 0 \end{bmatrix}, \hat{v}_2 = \begin{bmatrix} 0 \\ \hat{y} \\ 0 \end{bmatrix}, \quad (39)$$

and the functions on the quadrilateral faces are $$\hat{v}_3 = \begin{bmatrix} -1+\hat{x} \\ 0 \\ \hat{z} \end{bmatrix}, \hat{v}_4 = \begin{bmatrix} \hat{x} \\ 0 \\ -1+\hat{z} \end{bmatrix}, \hat{v}_5 = \begin{bmatrix} \hat{x} \\ 0 \\ \hat{z} \end{bmatrix}. \quad (40)$$

The mapping F from the reference prism to the physical prism is given by $$\begin{bmatrix} x \\ y \\ z \end{bmatrix} = F \begin{bmatrix} \hat{x} \\ \hat{y} \\ \hat{z} \end{bmatrix} = \quad (41)$$

$$P_{000} + (P_{100} - P_{000})\hat{x} + (P_{010} - P_{000})\hat{y} + (P_{001} - P_{000})\hat{z} + \quad (42)$$
$$(P_{110} - P_{100} + P_{000} - P_{010})\hat{x}\hat{y} + (P_{011} - P_{010} + P_{000} - P_{001})\hat{y}\hat{z},$$

where $P_{000}$ for example is the vector of physical coordinates of the point that corresponds to the reference point (0, 0, 0). Note that this mapping $F: \hat{\tau} \rightarrow \tau$ is no longer affine as it was in 2D, and as a consequence, in general, the integrals (33) cannot be evaluated analytically. One should use quadrature formulas to numerically approximate the integrals, for example $$\int_{\hat{\tau}} f(\hat{x}, \hat{y}, \hat{z}) d\hat{x} d\hat{y} d\hat{z} = \frac{1}{2} f\left(\frac{1}{3}, \frac{1}{2}, \frac{1}{3}\right) + O(h^2), \quad (43)$$

where h is the diameter of the physical prism.

If the original 2.5D griblock is split into s triangular prisms then equation (24) should now read $$b = b_1 b_1 + b_2 b_2 + \ldots + b_{3s} b_{3s}, \quad (44)$$

since there are now 3 given boundary fluxes: $b_i^{top}$, $b_i^{bot}$ and $b_i^{side}$ for each prism $\tau_i$. Also, the initial guess (28) must now satisfy $\int_{\tau_i} \text{div } v_I = b_i^{top} + b_i^{bot} + b_i^{side}$ for i=1, 2, . . . , s. The algorithm for computing the initial guess changes to Set $V_1^I = 1$.
For i=2, 3, . . . , s
set $V_i^I = V_{i-1}^I + b_i^{top} + b_i^{bot} + b_i^{side}$.
The algorithm for computing the velocity vector becomes:

$$\text{Set } V = V^I - \frac{CMV^I + \sum_{i=1}^{3s} b_i F_i}{CMC^T} C^T. \quad (45)$$

Although the present invention has been described with respect to specific details, it is not intended that such details should be regarded as limitations on the scope of the invention, except as and to the extent that they are included in the accompanying claims.

What is claimed is:

1. A computer-implemented method for constructing a velocity vector from a set of fluxes into or out of each face of a cell with a top face and a bottom face, comprising:
   divide the cell into triangular prisms with a common edge in the interior of the cell;
   create a set of equations for calculating the flux across each interior prism face;
   calculate a solution to the set of equations that minimizes the complementary energy of the cell; and
   using a computer to construct a velocity vector from the fluxes corresponding to the minimum complementary energy.

2. The method of claim 1 wherein the cells are 2.5-dimensional.

3. The method of claim 1 wherein the set of equations for calculating the flux are solved using Raviart-Thomas-Nedelec Mixed Finite Element equations with a divergence-free correction method.

4. The method of claim 3 wherein the Raviart-Thomas-Nedelec Mixed Finite Element spaces are lowest order.

5. The method of claim 1 wherein the set of equations is reduced to one equation per cell.

6. A computer-implemented method of calculating velocity vectors for cells in a grid from a set of fluxes across each grid boundary comprising:
   dividing a cell into subcells;
   forming an expression for the complementary energy of the cell;
   finding the minimizer of the complementary energy of the cell and calculating the internal fluxes corresponding to the minimal energy state; and
   using a computer to construct a velocity vector for the cell based on the internal fluxes corresponding to the minimized complementary energy.

7. The method of claim 6 wherein a divergence-free correction method is used to find the internal flux values that yield the minimum complementary energy.

8. The method of claim 6 wherein the grid is 2.5-dimensional.

9. The method of claim 6 wherein the flow between subcells is calculated by solving Darcy flow equations using a finite element method.

10. A computer-implemented method for constructing velocity vectors from a set of fluxes between cells in a grid, comprising:
    dividing the cell into triangular subcells equal in number to the number of cell boundaries for the cell;
    estimating the flux across the boundary between any two subcells;
    calculating the flux across all other internal boundaries between subcells based on the estimated flux;
    calculating the complementary energy of the cell;
    recalculating the fluxes across every internal boundary between subcells and complementary energy to determine the set of fluxes that minimize the complementary energy of the cell; and
    using a computer to construct velocity vectors from the sets of fluxes that correspond to the minimum complementary energy for each cell.

11. A computer-implemented method for calculating a set of velocity vectors for flow across a grid of cells from a set of fluxes between each of the cells divided into triangular subcells, comprising:
    calculating a set of internal fluxes across the internal boundaries between subcells for each cell;
    calculating the complementary energy for each cell from the internal fluxes;
    adjusting calculations for internal fluxes to find a set of internal fluxes that minimizes the complementary energy; and using a computer to construct a velocity vector from the fluxes corresponding to the minimized complementary energy.

12. The method of claim 11 wherein the complementary energy is minimized for individual cells.

* * * * *